US009276371B2

(12) United States Patent  (10) Patent No.: US 9,276,371 B2
Clowes et al.  (45) Date of Patent: Mar. 1, 2016

(54) SUPERCONTINUUM SOURCE

(71) Applicant: Fianium Ltd., Southampton (GB)

(72) Inventors: John Redvers Clowes, New Milton (GB); Anatoly Borisovich Grudinin, Southampton (GB); Adam Devine, Southampton (GB)

(73) Assignee: Fianium Ltd, Southampton (GB)

(*) Notice: Subject to any disclaimer, the term of this patent is extended or adjusted under 35 U.S.C. 154(b) by 153 days.

(21) Appl. No.: 14/184,439

(22) Filed: Feb. 19, 2014

(65) Prior Publication Data

US 2014/0233091 A1    Aug. 21, 2014

(30) Foreign Application Priority Data

Feb. 20, 2013  (GB) .................................... 1302960

(51) Int. Cl.
*H01S 3/23*    (2006.01)
*H01S 3/067*   (2006.01)
(Continued)

(52) U.S. Cl.
CPC ........ *H01S 3/06754* (2013.01); *G02B 6/02347* (2013.01); *G02B 6/26* (2013.01);
(Continued)

(58) Field of Classification Search
CPC ... H01S 3/067; H01S 3/06741; H01S 3/2308; H01S 3/2383
See application file for complete search history.

(56) References Cited

U.S. PATENT DOCUMENTS 8,194,310 B1     6/2012  Ketteridge et al.
8,593,726 B2 *  11/2013  Clowes ............... H01S 3/06758
                                                       359/346
(Continued)

FOREIGN PATENT DOCUMENTS

CN    102130412     7/2011
JP    2007298765    11/2007
JP    2008243953    10/2008

OTHER PUBLICATIONS

Combined Search and Examination Report issued by UKIPO, Apr. 19, 2013.
(Continued)

*Primary Examiner* — Ari M Diacou
(74) *Attorney, Agent, or Firm* — Peter Rainville

(57) ABSTRACT

A supercontinuum optical pulse source provides a combined supercontinuum. The supercontinuum optical pulse source comprises one or more seed pulse sources, and first and second optical amplifiers arranged along first and second respective optical paths. The first and second optical amplifiers are configured to amplify one or more optical signals generated by said one or more seed pulse sources. The supercontinuum optical pulse source further comprises a first microstructured light-guiding member arranged along the first optical path and configured to generate supercontinuum light responsive to an optical signal propagating along said first optical path, and a second microstructured light-guiding member arranged along the second optical path and configured to generate supercontinuum light responsive to an optical signal propagating along said second optical path. The supercontinuum optical pulse source further comprises a supercontinuum-combining member to combine supercontinuum generated in at least the first and second microstructured light-guiding members to form a combined supercontinuum. The supercontinuum-combining member comprises an output fiber, wherein the output fiber comprises a multimode optical fiber supporting a plurality of spatial modes at one or more wavelengths of the combined supercontinuum.

33 Claims, 6 Drawing Sheets

(51) Int. Cl.
*G02F 1/365* (2006.01)
*G02B 6/02* (2006.01)
*G02B 6/26* (2006.01)
*G02F 1/35* (2006.01)
*H01S 3/16* (2006.01)
*H01S 3/00* (2006.01)

(52) U.S. Cl.
CPC ............. *G02F 1/365* (2013.01); *H01S 3/2308* (2013.01); *G02F 2001/3528* (2013.01); *G02F 2201/02* (2013.01); *G02F 2201/05* (2013.01); *H01S 3/0092* (2013.01); *H01S 3/1618* (2013.01); *H01S 3/2383* (2013.01)

(56) References Cited

U.S. PATENT DOCUMENTS

| | | | |
|---|---|---|---|
| 8,785,884 B2 * | 7/2014 | Grudinin | G01N 21/6458 250/458.1 |
| 2003/0112839 A1 | 6/2003 | Xu et al. | |
| 2006/0045163 A1 * | 3/2006 | Chuang | H01S 3/06754 372/100 |
| 2007/0160091 A1 * | 7/2007 | Lee | H01S 3/067 372/6 |
| 2008/0212091 A1 | 9/2008 | Tanaka et al. | |
| 2009/0028193 A1 * | 1/2009 | Islam | H01S 5/146 372/6 |
| 2009/0095890 A1 | 4/2009 | Tanaka | |
| 2009/0097512 A1 | 4/2009 | Clowes et al. | |
| 2010/0198397 A1 | 8/2010 | Berghmans | |
| 2010/0225897 A1 | 9/2010 | Fermann et al. | |
| 2010/0277804 A1 | 11/2010 | Galvanauskas et al. | |
| 2010/0315700 A1 | 12/2010 | Lobo Ribeiro | |
| 2010/0329289 A1 | 12/2010 | Taylor et al. | |
| 2011/0002585 A1 * | 1/2011 | Gibson | G02B 6/2856 385/43 |
| 2011/0032602 A1 | 2/2011 | Rothenberg | |
| 2011/0134510 A1 | 6/2011 | Lippey et al. | |
| 2012/0027031 A1 | 2/2012 | Liu | |
| 2013/0107351 A1 * | 5/2013 | Clowes | H01S 3/06758 359/341.3 |

OTHER PUBLICATIONS

P. A. Zhokhov and A. M. Zheltikov, Nonlinear-Optical Coherent Combining of Supercontinua from Multiple Filaments, Phys. Rev. A 86, 013816 (2012) [5 PAGES].
Machine Translation of JP2007298765.
Machine Translation of JP2008243953.
English Abstract CN102130412.
D. Noordegraff, All-Fiber 7×1 signal combiner for incoherent laser beam combining, Proceedings of SPIE, the International Society for Optical Engineering, 2011.
Q. Xiao, Tapered Fused Fiber Bundle Coupler Capable of 1kW Laser Combining and 300W Laser Splitting. Laser Physics 2011, vol. 21 No. 8. 1415-1419.
Baishi Wang, Review of Fabrication Techniques for Fused Fiber Components for Fiber Lasers. Fiber Lasers VI: Technology, Systems, and Applications. Proceedings of the SPIE, vol. 7195 (2009).
Sergio G. Leon-Saval, Photonic lanterns: a study of light propagation in multimode to single-mode converters, Optics Express vol. 18, No. 8, 8430, 2010.
J.C. Travers et al., Visible supercontinuum generation in photonic crystal fibers with a 400 W continuous wave fiber laser, Optics Express vol. 16, No. 19, 14435, 2008.
Reply to UKIPO Examination Report for UK Patent Application GB1302960.8 dated Apr. 20, 2015.

* cited by examiner

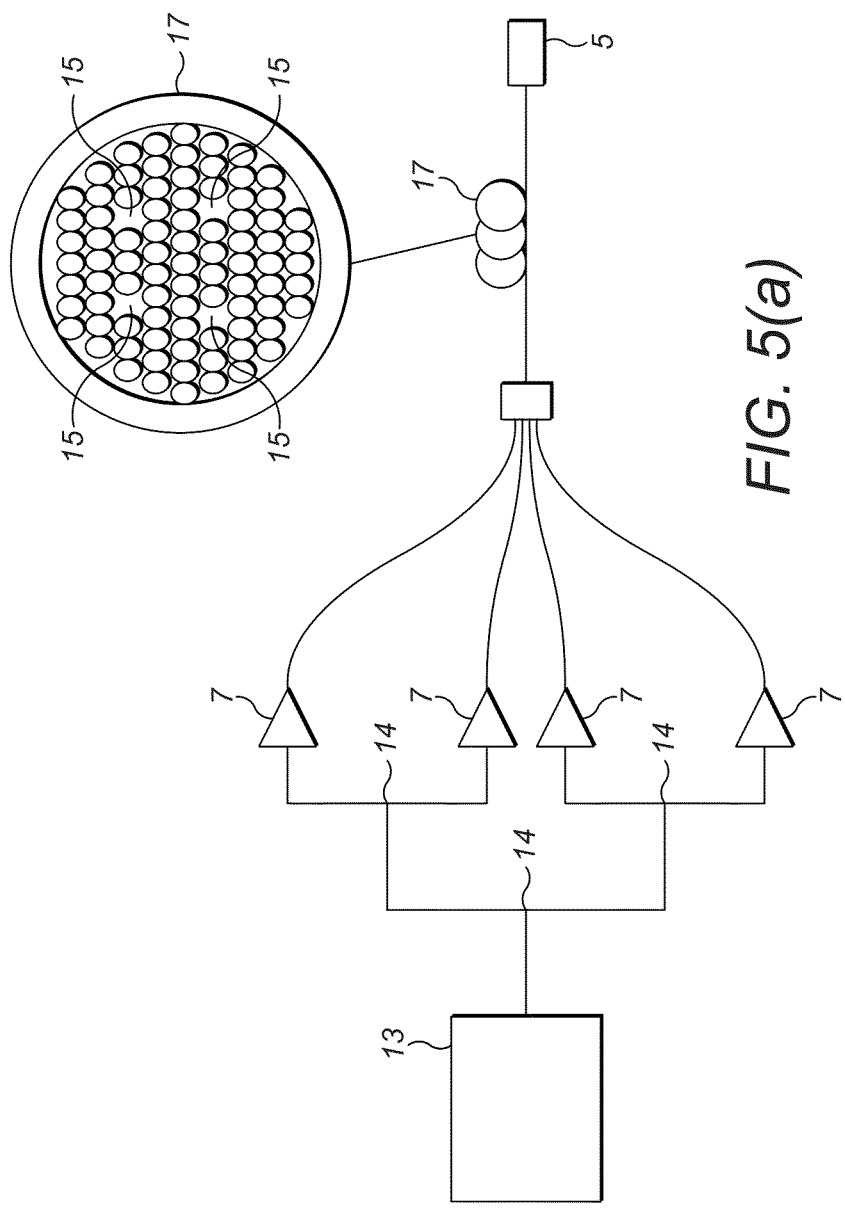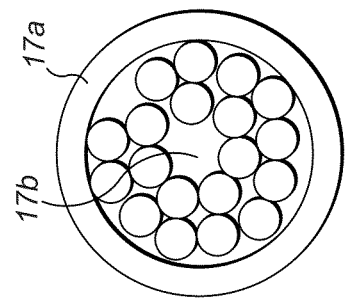

SUPERCONTINUUM SOURCE

CROSS REFERENCE TO RELATED APPLICATIONS

The present application claims priority under 35 U.S.C. §119(a) to GB Application 1302960.8, entitled "A Supercontinuum Source", filed 20 Feb. 2013. The foregoing application is incorporated by reference herein.

FIELD OF THE INVENTION

This disclosure relates to a supercontinuum source.

BACKGROUND

Supercontinuum generation in microstructured fibre was proposed in "Visible continuum generation in air silica microstructure optical fibres with anomalous dispersion at 800 nm", J. K. Ranka, R. S. Windeler, and A. J. Stentz, Optics Letters, 2000. Vol. 25: p. 25-27.

SUMMARY

The present invention provides a supercontinuum optical pulse source to provide a combined supercontinuum. The supercontinuum optical pulse source comprises one or more seed pulse sources, and first and second optical amplifiers arranged along first and second respective optical paths. The first and second optical amplifiers are configured to amplify one or more optical signals generated by said one or more seed pulse sources. The supercontinuum optical pulse source further comprises a first microstructured light-guiding member arranged along the first optical path and configured to generate supercontinuum light responsive to an optical signal propagating along said first optical path, and a second microstructured light-guiding member arranged along the second optical path and configured to generate supercontinuum light responsive to an optical signal propagating along said second optical path. The supercontinuum optical pulse source further comprises a supercontinuum-combining member to combine supercontinuum generated in at least the first and second microstructured light-guiding members to form a combined supercontinuum. The supercontinuum-combining member comprises an output fibre, wherein the output fibre comprises a silica-based multimode optical fibre supporting a plurality of spatial modes at one or more wavelengths of the combined supercontinuum.

The supercontinuum-combining member is preferably passive (i.e.: does not amplify), and therefore provides its multimode output in compliance with the law of brightness, which dictates that the brightness of the output of the supercontinuum-combining member cannot be greater than the combined brightness of the inputs.

In this way, various embodiments of the present invention sacrifice the possibility of single mode output and instead combine a plurality (e.g.: multiple) supercontinua generated along separate paths to form a multimode output. A sufficient number of paths may be chosen so that the combined output is at a desired power level.

At the highest power levels, photodarkening can occur in microstructured fibre, whereby loss occurs due to photon-induced defects, particularly in the visible region of the spectrum. It is well known to mitigate against photodarkening in high power supercontinuum sources by loading the silica of the microstructured fibre with highly reactive, mobile species such as deuterium or hydrogen. These react with a defect site (dangling Si—O bond) to form an Si—O-D or Si—O—H bond which no longer absorbs radiation in the visible or near infra-red region of the supercontinuum spectrum.

In accordance with various embodiments of the invention, the amplifiers of the supercontinuum source can be configured so that the average power propagating along each optical path is sufficiently low so as to substantially avoid the effects of photodarkening. Any number of supercontinua can be generated in this way and combined in the supercontinuum-combining member so as to provide a desired power level.

In this way, embodiments of the invention permit scalability of the output power whilst mitigating or avoiding the effects of photodarkening.

In an embodiment, the first microstructured light-guiding member comprises a first microstructured optical fibre and the second microstructured light-guiding member comprises a second microstructured optical fibre.

In embodiments, the first and second microstructured light-guiding members may be included in a single optical fibre, which may be integrally formed with the output fibre of said supercontinuum-combining member.

In embodiments, the first amplifier can comprise the first microstructured light guiding member, and the second amplifier can comprise the second microstructured light-guiding member.

In embodiments, the first and second amplifiers can be configured to respectively provide first and second amplified signals, and the first and second microstructured light-guiding members can be configured to respectively receive the first and second amplified signals and to generate supercontinuum responsive thereto.

In an embodiment, the one or more seed pulse sources may comprise a single seed pulse source. In this way, the first and second optical amplifiers may be optical communication with the same seed pulse source.

Alternatively, the one or more seed pulse sources may comprise a first seed pulse source in optical communication with the first optical amplifier and a second seed pulse source in optical communication with the second optical amplifier.

In an embodiment, the supercontinuum-combining member comprises one or more input fibres. The input fibres may be multimode fibres, single mode fibres and/or may comprise microstructured fibres. The inputs fibres may have a numerical aperture above 0.3 at one or more of the wavelengths of the combined supercontinuum.

In an embodiment, the output fibre of the supercontinuum-combining member may comprise an air-clad fibre.

In various embodiments, the supercontinuum optical pulse source comprises:

N optical amplifiers arranged along n respective optical paths, wherein said N optical amplifiers are configured to amplify one or more optical signals generated by said one or more seed pulse sources, and N microstructured light-guiding members respectively arranged along said optical paths and respectively configured to generate supercontinuum light responsive to an optical signal propagating along a respective optical path, wherein the supercontinuum-combining member is configured to combine supercontinuum generated in said N microstructured light-guiding members to form a combined supercontinuum.

The multimode output fibre of said supercontinuum combining member may support N or more optical modes.

In an embodiment, the n optical amplifiers are in optical communication with the same seed pulse source.

In some embodiments, N is greater than 4. In some embodiments, N is greater than 10.

In an embodiment, the supercontinuum-combining member comprises one or more input fibres which are single mode at one or more of the wavelengths of the combined supercontinuum or at one or more of the wavelengths of the one or more seed pulse sources.

In an embodiment, the supercontinuum-combining member has one or more multimode input fibres which support a plurality of spatial modes at one or more wavelengths of the combined supercontinuum, or at one or more of the wavelengths of the one or more seed pulse sources.

In some embodiments, the multimode input fibres of the supercontinuum-combining member are configured to support no more than or less than four modes at one or more wavelengths of the combined supercontinuum, or at one or more of the wavelengths of the one or more seed pulse sources.

In some embodiments, the multimode input fibres of the supercontinuum-combining member are configured to support more than four modes at one or more wavelengths of the combined supercontinuum, or at one or more of the wavelengths of the one or more seed pulse sources.

In an embodiment, the output fibre of the supercontinuum-combining member is arranged to support more modes than any of the input fibres of the supercontinuum-combining member. In an embodiment, the output fibre of the supercontinuum-combining member is arranged to support at least as many modes as the combined sum of modes supported by the input fibres.

In an embodiment, the supercontinuum generated by one or more of the microstructured light guiding members has a spectrum that includes wavelengths falling within the visible/NIR regions of the spectrum. As used herein, the term visible refers to light including a wavelength between 400 nm and 700 nm, and the term near infra-red (NIR) refers to light of wavelength above 1000 nm.

In an embodiment, the combined supercontinuum has a spectrum from the blue (<500 nm) to the transmission edge of silica (>2 μm).

In embodiments, the optical amplifiers are configured so that in use, the power in a microstructured light-guiding member over the wavelength range 400 nm to 700 nm does not exceed 1 W, or does not exceed 2 W, or does not exceed 4 W. The optical amplifiers can be also configured so that in use, the power in a microstructured light-guiding member over the wavelength range 400 nm to 700 nm is greater than 0.5 W.

In an embodiment, one or more of the microstructured light-guiding members receives average optical power in excess of 0.5 Watt, or in excess of 1 Watt, or in excess of 2 Watts.

In an embodiment, the optical amplifiers are configured so that in use, the power in a microstructured light-guiding member over the wavelength range 400 nm to 700 nm is greater than 0.5 W, greater than 1 W, or greater than 2 W.

In an embodiment, one or more of the microstructured light-guiding members receives average optical power that is no greater than 1 Watt, or no greater than 2 Watts, or no greater than 4 Watts.

In embodiments, the amplifiers may be configured to generate pulses in the Ytterbium gain band, such as by comprising Ytterbium gain band amplifiers.

In an embodiment, the first and second optical amplifiers may comprise optical fibre amplifiers.

In various embodiments, the one or more seed sources are configured to generate pulses of duration less than 1 ns or of less than 100 ps.

In an embodiment, the output fibre of said supercontinuum-combining member supports a plurality of spatial modes at all wavelengths of the combined supercontinuum.

In an embodiment, the supercontinuum optical pulse source further comprises a third optical amplifier arranged along a third optical path, and a third microstructured light-guiding member arranged along the third optical path and configured to generate supercontinuum responsive to an optical signal propagating along said third optical path.

The present invention also provides a supercontinuum (SC) source to provide a supercontinuum including visible range wavelengths, comprising:

one or more seed sources;

first and second microstructured optical fibres (MSOFs) in optical communication with said one or more seed sources, said first MSOF for generating a first SC including wavelengths from 400 nm to 700 nm ("visible range wavelengths") and said second MSOF for generating a second SC including visible range wavelengths;

a fibre optic coupler for combining the first and second supercontinua, said fibre optic coupler comprising an output optical fibre, a first input fibre in optical communication with said first MSOF and a second input optical fibre in optical communication with said second MSOF, wherein said first and second optical fibres are single moded at a wavelength or wavelengths within the visible range wavelengths and wherein said output optical fibre is multimoded at a wavelength or wavelengths within the visible range wavelengths; and wherein said SC source is further adapted such that the optical power in the first MSOF over the visible range wavelengths does not exceed a threshold power and wherein the optical power over the visible range wavelengths in the second MSOF does not exceed the threshold power, said threshold power being 1 Watt, 2 Watts or 4 Watts.

The first input fibre may comprise the first MSOF.

The first and second MSOFs may be in optical communication with the same seed source.

At least one of said first and second MSOFs may be doped so as to act as a gain medium to provide optical amplification.

The seed source may comprise a pulsed seed source configured to generate pulses of duration less than 1 ns or less than mops.

BRIEF DESCRIPTION OF THE DRAWINGS

Embodiments of the invention will now be described, by way of example only, with reference to the accompanying drawings, in which:

FIG. 5(*a*) is a schematic of a supercontinuum source in which each core of a multi-core microstructured fibre is pumped by amplified light from a respective optical amplifier to form a plurality of supercontinua;

FIG. 5(*b*) is a sectional view showing a single multimode output core at the output of a fibre having multiple-cores at its input;

DETAILED DESCRIPTION

Overview

Figure 1:
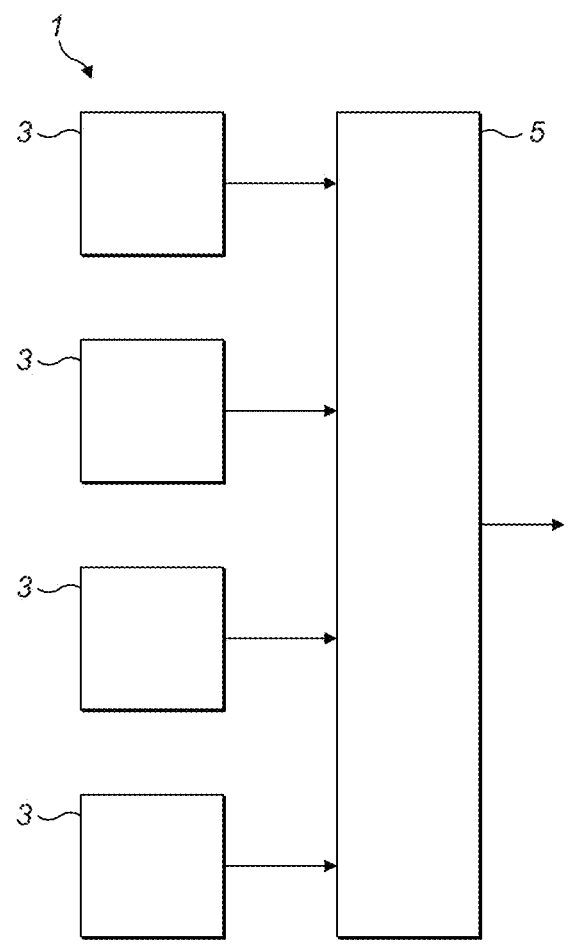
FIG. 1 is a schematic of a supercontinuum source according to a first embodiment.

FIG. 1 is a schematic of a supercontinuum source 1 according to a first embodiment. As shown, the supercontinuum source 1 comprises a plurality of supercontinuum generators 3 and a supercontinuum-combining member 5. The supercontinuum-combining member 5 is configured to combine the supercontinua generated by the supercontinuum generators 3 to form a combined supercontinuum.

Although the schematic of FIG. 1 shows four supercontinuum generators 3, any number of supercontinuum generators could be provided so as to obtain a desired output power level of the combined supercontinuum. The letter n is used herein to denote the number of supercontinua to be combined.

Supercontinuum Generators

In an embodiment, each supercontinuum generator 3 comprises an optical amplifier 7 and a microstructured light-guiding member in the form of a microstructured optical fibre 9. The optical amplifier 7 and microstructured fibre 9 are arranged along an optical path such that supercontinuum is generated as light propagates along the optical path.

The optical paths for each supercontinuum generator are arranged in parallel. It will be appreciated that the expression "in parallel" is used in relation to the optical paths to distinguish their configuration from an "in series" configuration, and not to describe the physical relationship between the paths. In practice, the optical paths, whilst being configured in parallel, may run in any appropriate direction, may be curved, may wind or otherwise take a circuitous path, and may be respectively defined by optical fibres which may overlap or be wound around one another one.

Each optical amplifier 7 may comprise an optical fibre amplifier. The optical fibre amplifier may have two or more stages of optical amplifier cascaded to incrementally provide gain to the optical signal. The output of the optical fibre amplifier may comprise a large mode area, single mode fibre.

Figure 2:
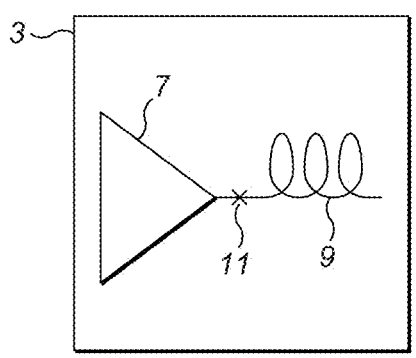
FIG. 2 illustrates an exemplary configuration of the optical amplifier and microstructured fibre of a supercontinuum generator.
Figure 3:
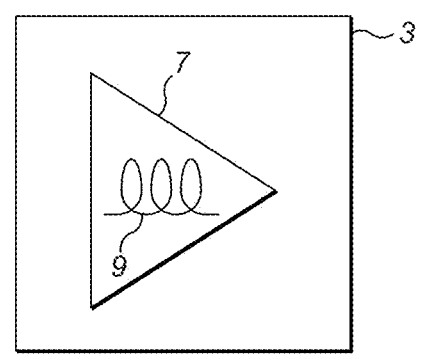
FIG. 3 illustrates another exemplary configuration of the optical amplifier and microstructured fibre of a supercontinuum generator.

FIGS. 2 and 3 illustrate exemplary configurations of an optical amplifier 7 and a microstructured optical fibre of a supercontinuum generator 3.

In the example of FIG. 2, a microstructured optical fibre 9 is located downstream of the optical amplifier 7 so as to receive an amplified signal generated by the amplifier 7. The amplifier output fibre and microstructured optical fibre may be joined together at a splice 11.

In the alternative example of FIG. 3, an optical amplifier 7 includes a microstructured optical fibre 9, which may be doped so as to act as a gain medium of the amplifier.

In either case, the optical amplifier can be configured such that the power provided to the microstructured fibre is high enough to cause supercontinuum spectral broadening. In embodiments, the power provided to the microstructured fibre is above a first threshold so as to generate a supercontinuum, and below a second threshold so as to substantially avoid the effects of photodarkening.

The second threshold may be no greater than 1 Watt of power, or no greater than 2 Watts of power, or no greater than 4 Watts of power, where the threshold refers to power in the spectral range from 400 nm to 700 nm (referred to herein as the visible range of wavelengths). "Power" means average optical power. It has been found that higher powers can result in photodarkening in the 550 nm to 700 nm spectral range by more than 50% over 100 hours continuous operation.

The first threshold can be greater than 0.5 Watt, or greater than 1 Watt, or greater than 2 Watts.

Rather than a single microstructured fibre, a supercontinuum generator may comprise a plurality of microstructured fibres arranged one after the other to define a light propagation path along which supercontinuum is generated.

The microstructured fibres 9 may be formed of silica. Alternatively, one or more (or all) of the microstructured fibres may be fabricated from other glasses, for example soft glasses such as fluoride, chalcogenide or telluride.

In various embodiments, each of the supercontinuum generators may produce a diffraction limited output. Alternatively, one or more of the supercontinuum generators may produce a multimode output.

Seed Source(s)

In some embodiments, supercontinuum source 1 includes a plurality of seed sources to seed the amplifiers 7 of respective supercontinuum generators 3. In an embodiment, the seed sources are configured to generate short optical pulses. To this end, the seed sources may respectively comprise an oscillator such as a gain switched laser diode or modelocked fibre laser. The pulsed signal generated by the seed sources is amplified by respective amplifiers 7 such that pulsed supercontinuum is generated by light propagating along microstructured optical fibre 9 in each supercontinuum generator. The wavelength of the pulses output from the seed sources may be for example a wavelength within the gain bandwidth of Ytterbium. The pulses output from the seed sources may comprise a wavelength of about 1064 nm. The pulse energy and peak power of pulses from the seed source(s) can be low, e.g.: of the order of 100 Picojoules and 10 Watts respectively.

Figure 4:
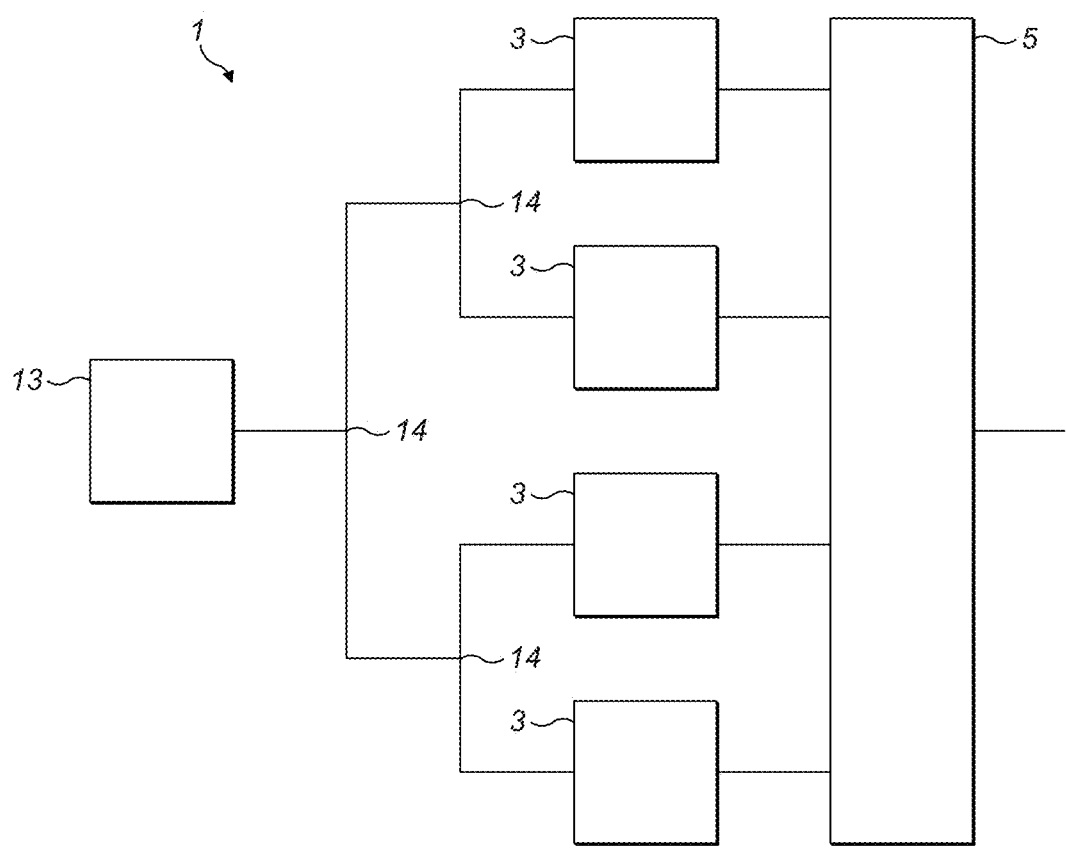
FIG. 4 is a schematic of a supercontinuum source in which a single seed source is provided to seed the supercontinuum generators.

FIG. 4 illustrates an embodiment in which a single seed source 13 seeds more than one of the supercontinuum-generators 3. This approach has the benefit of reducing the cost and complexity of the system. Moreover, in embodiments in which the seed source provides a pulsed output, the supercontinuum output pulses of the supercontinuum-generator 3 are advantageously output synchronous to the same clock as the seed source. Synchronous output is important for example is applications in which a beam is detected based on a predefined frequency (e.g.: to identify light from a given source if the frequency is known). Synchronous output can also be important for biomedical applications (e.g.: for lifetime measurements). It will be understood that the split lines 14 in FIG. 4 represent optical splitters.

It will be appreciated that in any of the embodiments described herein, the supercontinuum-generators 3 may be seeded with a single seed source, or alternatively with one seed source for each supercontinuum generator 3. The number of seed sources could be between one and n, where n is the number of supercontinuum generators 3.

In embodiments, the optical paths of respective supercontinuum generators 3 define separate optical paths from the one or more seed sources to the supercontinuum-combining member 5.

Supercontinuum Generation in Multi-Core Microstructured Fibre

As described above, in some embodiments each supercontinuum generator 3 may comprise a microstructured light-guiding member in the form of a microstructured optical fibre 9. However, alternatively, the microstructured light-guiding members of the supercontinuum generators 3 may be provided as separate cores of a single multi-cored nonlinear microstructured fibre. FIG. 5(*a*) shows an example in which each core 15 of a microstructured fibre 17 is pumped by amplified light from a respective optical amplifier 7 to form a plurality of supercontinua, which are combined in a supercontinuum-combining member 5 to form a combined supercontinuum output.

A microstructured member, such as a microstructured optical fibre, includes a guiding region (e.g., a core of a fibre) and longitudinally extending features (e.g., air holes) disposed about the guiding region, where the features have an index of refraction that is different than that of the material surrounding the features. The features facilitate light guidance via one or more mechanisms, such as, for example, index guidance or via the creation of a photonic bandgap. Microstructured optical fibres include so called holey fibres, photonic crystal fibres, and air clad fibres.

FIG. 5(*a*) shows each optical amplifier 7 seeded by a single seed source 13. As in as in FIG. 4, the junctions 14 where lines split represent optical splitters.

As previously indicated, each optical amplifier 7 may alternatively be seeded by a respective seed source, or the number of seed sources could be between one and n, where n is the number of supercontinuum generators 3.

Supercontinuum-Combining Member

The supercontinuum-combining member 5 is configured to combine supercontinua generated by the supercontinuum generators 3 into a multimode optical fibre which supports one or more spatial modes at one or more wavelengths of the combined supercontinuum.

The supercontinua generated by the supercontinuum generators 3 may be coupled into the supercontinuum-combining member 5 by way of one or more fibre splices between the supercontinuum generators 3 and the supercontinuum-combining member 5, or alternatively by free-space coupling, for example using lenses and/or mirrors.

Figure 6:
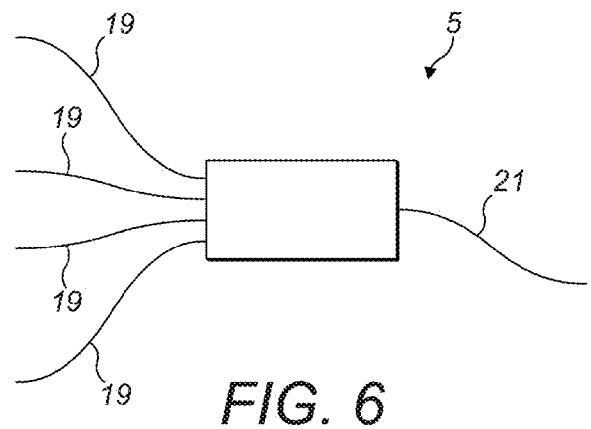
FIG. 6 shows an exemplary supercontinuum-combining member.

FIG. 6 shows an example of a supercontinuum-combining member 5 comprising a fibre-coupled device having a plurality of input fibres 19 and an output fibre 21. The output fibre comprises a multimode optical fibre which supports one or more spatial modes at one or more wavelengths of the combined supercontinuum. The device may comprise a fused fibre device (e.g.: a tapered fused fibre bundle coupler).

Figure 7:
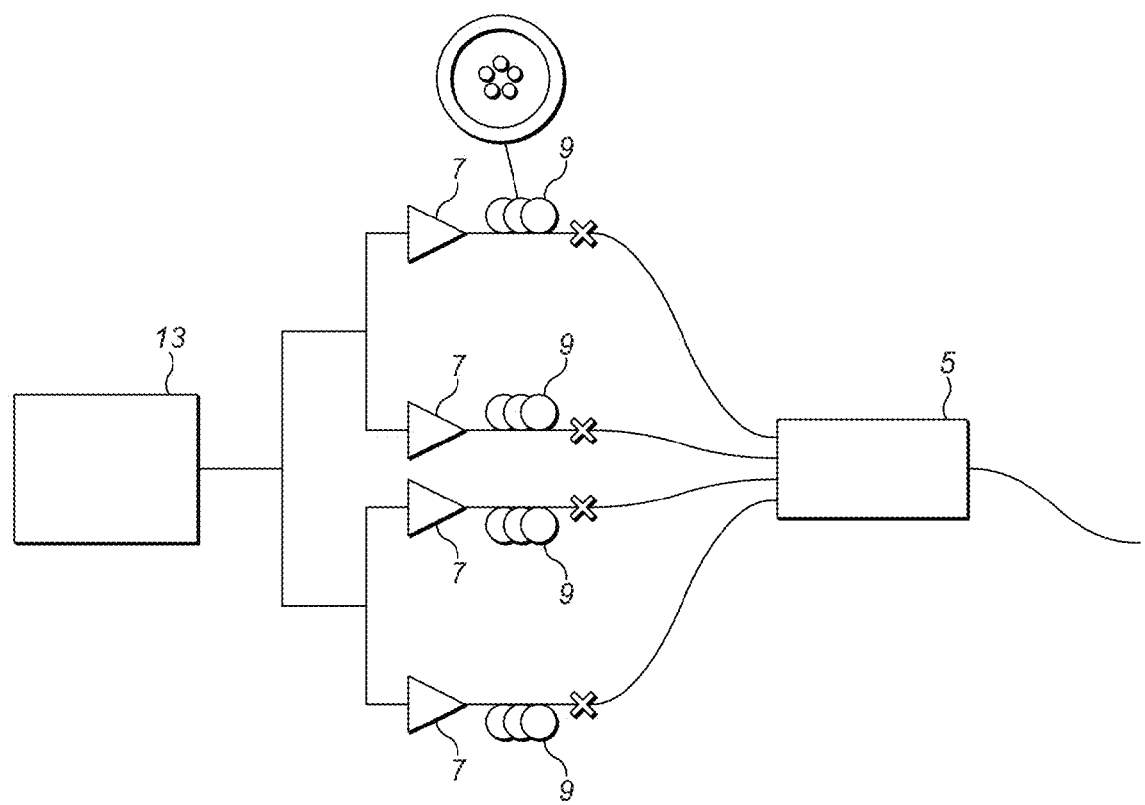
FIG. 7 shows the supercontinuum-combining member of FIG. 6 in place in one exemplary supercontinuum source.

FIG. 7 shows the fibre combiner 5 in a particular supercontinuum source in which a plurality of supercontinuum generators 3 are seeded by a single seed source 13, and in which each supercontinuum generator comprises a microstructured fibre 9 located downstream of an optical amplifier 7, wherein respective microstructured fibres are in this example spliced to respective inputs of the fibre combiner. It will however be understood that this example is not intended to be limiting and that the fibre combiner 5 could be used as a supercontinuum-combining member in any of the embodiments described above with reference to FIGS. 1-5, or indeed with any of the supercontinuum sources disclosed herein Moreover, although the fibre combiner 5 of FIG. 6 is shown with four inputs and one output, it will be appreciated that the number of inputs may be more or less than four to accommodate a desired number n of supercontinua to be combined, and in some embodiments, the number of outputs may be greater than one.

Figure 8:
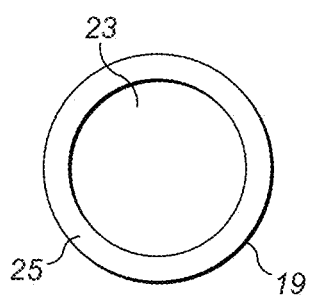
FIG. 8 is sectional view of a multimode input fibre of an exemplary supercontinuum-combining member.

In an embodiment, the input fibres 19 of the fibre combiner 5 respectively comprise multimode fibre (e.g.: multimode step-index fibre). Such a fibre combiner 5 may be formed as a multimode tapered fibre bundle. FIG. 8 shows a cross sectional view of a multimode input fibre 19 comprising a multimode core 23 of area $A_1$ and cladding 25. The refractive index of the cladding 25 is lower than that of the core 23 to produce a core numerical aperture $NA_1$. The output fibre is also a multimode fibre having a core and cladding, but has numerical aperture $NA_2$ and core area $A_2$. The brightness in the output fibre cannot be greater than the combined brightness of the n input fibres and the brightness law is obeyed, i.e.:

$$n*(A_1)*(NA_1)^2 \leq (A_2)*(NA_2)^2$$

The foregoing formula is for the case where the input fibres have the same NA and core area and there is one output fibre; more generally, the input fibres can have different NAs and/or core areas, and there can be more than one output fibre, and in such a case the sum of brightnesses of the input fibres must be less than or equal to the sum of the brightnesses of the output fibres. In some embodiments, the microstructured light-guiding members 9 of the supercontinuum generators 3 are respectively spliced to input fibres of the supercontinuum-combining member at a splice point. In this way, it is possible to have n supercontinuum outputs, each with a high spatial brightness and in some examples diffraction limited beam quality, combined in a combiner 5 supporting many modes (for example many tens of modes), to produce a highly degraded beam quality. That is, through the use of a many-moded combiner, the brightness of the n-supercontinua is not well maintained through the beam combination.

Consider for example the case of n=7, and the combiner 5 (which may be referred to herein as a "pump combiner") comprising a 7:1 pump combiner with input fibres having 100 μm core diameters and numerical aperture $NA_1$=0.15, and an output fibre 21 having core diameter 125 μm and numerical aperture $NA_2$=0.45. By filling the modes of the combiner, the brightness of the combined supercontinuum light can be degraded by orders of magnitude.

In another embodiment, the input fibres 19 of the fibre combiner 5 comprise single mode fibre. The multimode output fibre 21 supports at least n modes, where n is the number of supercontinua to be combined.

Figure 9:
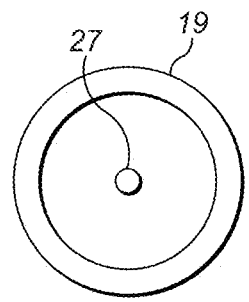
FIG. 9 is a sectional view of a single mode input fibre of an exemplary supercontinuum-combining member.

FIG. 9 shows a cross sectional view of a single mode input fibre 19 comprising a single mode core 27. Supercontinuum light generated by respective supercontinuum generators 3 may be launched into the input fibres 19, for example by way of respective splices between the microstructured light-guiding members 9 of the supercontinuum generators 3 and the input fibres 19 of the fibre combiner 5.

The multimode output fibre may support n modes. The brightness is maintained if each of the n input fibres of the fibre excites one of n modes in the combiner output fibre.

However, if the n single mode input fibres of the combiner are combined into an output fibre having more than n modes, but not substantially more than n modes, the brightness is nonetheless fairly well maintained.

In some embodiments, the supercontinuum-combining member may be integral with the supercontinuum-generators. For example, the multi-cored nonlinear microstructured fibre 17 of FIG. 5(*a*) may be modified at the fibre output to form a single multimode fibre with a multi mode core by collapsing central holes and leaving surrounding microstructure intact. FIG. 5(b) shows a cross sectional view of the fibre output 17a, illustrating the single multimode output core 17b.

Alternatively, such a multi-cored microstructured fibre may be provided as a linear, rather than a nonlinear device to act as a supercontinuum-combining member. In cases in which supercontinua are generated in plurality of microstructured fibres (such as described above with reference to FIGS. 2 and 3) each microstructured fibre may be arranged so that its output is launched into a respective combiner core.

In an embodiment, the supercontinuum-combining member 5 comprises a multimode fibre having a plurality of single mode cores within the multimode fibre, where the number of cores is denoted by N. N single mode fibres can be spliced to the multimode combiner, with each of the n-single mode fibres spliced to excite the mode of the N single mode cores of the combiner. The output of the multimode, multi-core combiner can be tapered down, resulting in an output fibre in the form of a multimode fibre supporting M modes, wherein M is greater than or equal to N.

As discussed above, various embodiments of the present disclosure involve combining multiple supercontinuum outputs into a single multimode optical fibre. According to some embodiments, high brightness may be advantageously maintained. As is well known to those skilled in the art, the brightness law states that the brightness of a source cannot be increased by passive means (i.e.: without amplification). Brightness of a source is proportional to the power of the source and inversely proportional to the beam area and square of the divergence ($NA^2$).

In combining supercontinuum outputs, it may also be important to minimise loss, regardless of whether one wishes to maintain high brightness. For supercontinuum sources, owing to their extremely broad bandwidth and the nature of nonlinear microstructured fibres that generate supercontinuum, minimising loss is not straightforward.

Figure 10:
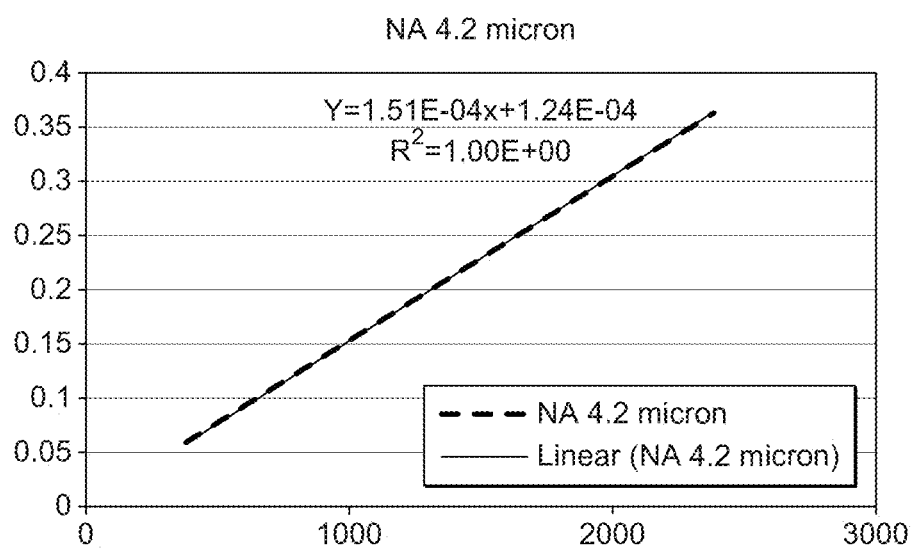
FIG. 10 shows the variation in numerical aperture (NA) for an exemplary nonlinear microstructured fibre.

In accordance with various embodiments of the invention, multiple fibre outputs can be combined into a single fibre output using 1) all-fibre arrangements such as a tapered fibre bundle, or 2) free-space methods using lenses and/or mirrors. In either case, the component that generates the supercontinuum may comprise a microstructured fibre such as a holey fibre or PCF comprising a solid core surrounded by a series of air holes. In such fibres, the air holes act to produce a reduced effective index of the cladding so as to form an optical waveguide. Unlike step index fibres, the numerical aperture (NA) of this waveguide is not constant. Instead, the effective index of the cladding region and hence the NA of the waveguide is a function of wavelength. FIG. 10 shows the variation in NA for an exemplary nonlinear microstructured fibre with core diameter of approximately 4 µm, which is designed for generating supercontinuum when pumped at a pump wavelength in the region of 1 µm. The fibre NA varies from approximately 0.06 at the blue end of the supercontinuum (400 nm) to more than 0.35 nm at the red end of the supercontinuum (2.4 µm).

The variation of the fibre NA can be modified to some extent by gradual collapsing of the holes in the microstructured fibre at the fibre output. This effect may be used to cause the fibre to guide all wavelengths of the supercontinuum with diffraction limited mode quality. However, even with this modification, at the output of the fibre, different wavelengths of the supercontinuum have very different divergence angles.

As shown in FIG. 10, launching the output of a supercontinuum into a step-index fibre, low loss across the spectrum can be achieved if the NA of the step-index fibre is greater than 0.35, so that the acceptance cone of the fibre is wide to capture the most divergent wavelengths of the supercontinuum.

Accordingly, in order to couple from a microstructured fibre to an input fibre of the fibre combiner of FIG. 7 with low loss, the numerical aperture of the combiner input fibres 19 should be above a threshold value. The threshold value is the highest value of the numerical aperture of the microstructured fibre over the supercontinuum spectrum. In the case analysed in FIG. 10, the threshold value is 0.35.

In embodiments, a sufficiently high numerical aperture of the input fibre may be achieved if the input fibre comprises a large fibre having a low index cladding, such as a polymer coating or a down doped cladding (e.g.: a fluorine doped silica cladding) to produce a waveguide. Alternatively, or in addition, a sufficiently high numerical aperture may be achieved by sufficiently high dopant levels in the core region of the input fibre (for example high Germanium doping).

These solution lead to a highly multimode input fibre and high degradation of the brightness. High dopants also increase the likelihood of photon-induced optical damage (photodarkening), which results in loss and degradation over time.

In an alternative solution, a supercontinuum-combining member is provided having a plurality of microstructured input fibres, and a multimode output fibre. The microstructured input fibres 5 of the combining-member may comprise supercontinuum-generating microstructured fibres 9 of the supercontinuum source. Alternatively, the microstructured input fibres may be configured so that they can be spliced directly or indirectly to the supercontinuum generating microstructured fibres 9 with minimal loss and without substantially degrading brightness.

Figure 11:
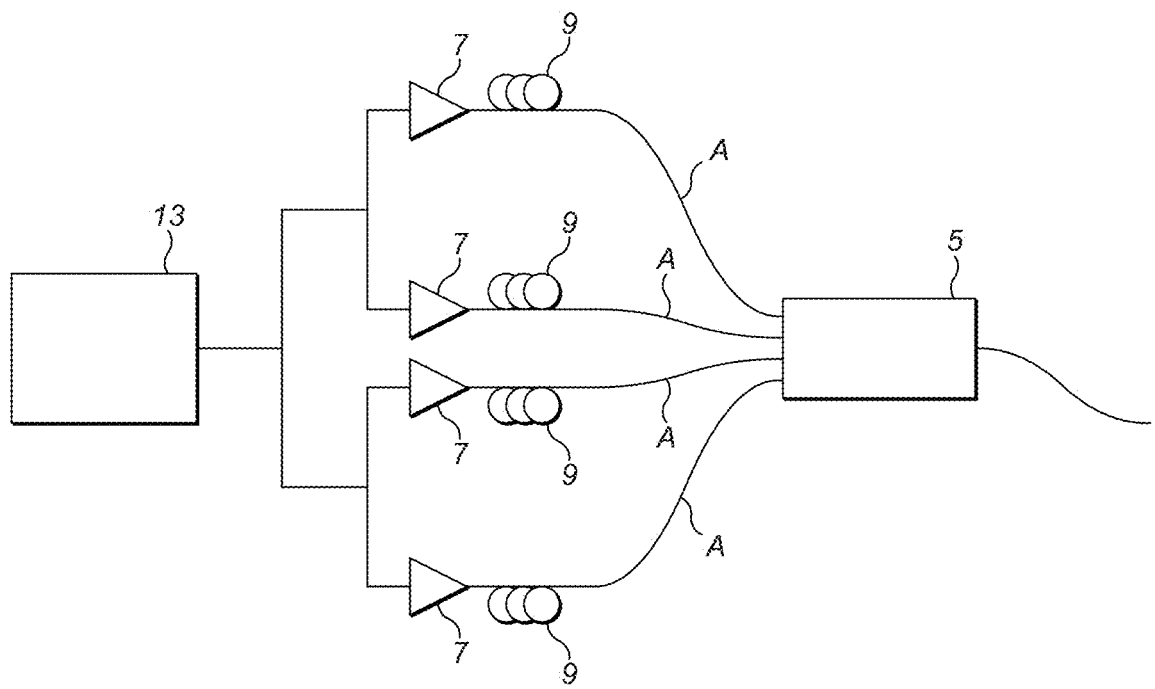
FIG. 11 is a schematic of an exemplary supercontinuum source in which the input fibres of a supercontinuum-combining member comprise supercontinuum-generating microstructured fibres.

FIG. 11 shows one example of a supercontinuum source in which the input fibres of a supercontinuum-combining member 5 comprise supercontinuum-generating microstructured fibres 9. It will however be appreciated that the input fibres of the supercontinuum-combining member 5 may comprise the microstructured fibres 9 of the supercontinuum generators 3 in any of the embodiments described herein in which supercontinua are generated in microstructured fibres.

A supercontinuum-combining member having microstructured fibre inputs may be manufactured in a similar manner to a tapered fibre bundle. That is, multiple microstructured fibres may be stacked together, heated and drawn down to a taper whilst allowing the holes of the microstructured fibre to collapse. The bundle is then cleaved and spliced to an output fibre whose waveguide area and NA are such that the brightness law is obeyed (e.g.: to a low-index clad fibre).

In embodiments, the output fibre of the supercontinuum-combining member may also have a high numerical aperture greater than 0.35 for low optical loss. Again, this can be achieved by a highly doped core region, but doping can exacerbate photodarkening. Alternatively, the output fibre can be a glass fibre with low-index polymer to form the waveguide. Such a fibre may be provided with an output diameter of at least 80 µm to facilitate handling of the fibre, which may lead to highly multimode output.

In an alternative solution, a supercontinuum-combining member is provided having an output fibre comprising a microstructured fibre, e.g: an air clad microstructured fibre. The supercontinuum-combining member may comprise fibre inputs, and may be formed by as a tapered fibre bundle. Alternatively however, free space coupling may be used to launch the supercontinua generated by the supercontinuum generators 3 directly into the air clad output fibre.

Figure 12:
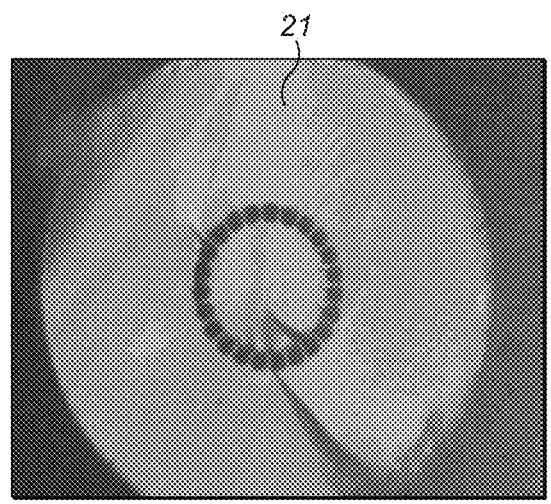
FIG. 12 shows an output fibre of an exemplary supercontinuum-combining member.

The air cladding structure leads to a small area waveguide structure with high NA and yet a large fibre outer diameter so that the fibre can be handled easily. In embodiments, the microstructure creates an inner waveguide with numerical aperture up to 0.6. An exemplary output fibre is illustrated in FIG. 12.

In some embodiments, a supercontinuum-combining member may be provided having microstructured fibre input fibre and an output fibre having an air cladding. Such a combining member may be manufactured by tapering a plurality of microstructured fibres down to a bundle whilst allowing the holes of the microstructured fibre to collapse, and then, after cleaving, splicing the bundle to an air-clad fibre.

As discussed above, in some embodiments, supercontinua generated by the supercontinuum generators 3 may be coupled directly into an output fibre of a supercontinuum-combining member by way of free space coupling. Since anti-reflection components may not be available to cover the supercontinuum bandwidth in particular cases, it is preferred to make used of a curved mirror having a metal coating to focus the combined light into the output fibre, since such coatings can provide very broadband, uniform, high reflection mirrors.

Many modifications and variations will be evident to those skilled in the art, that fall within the scope of the following claims:

The invention claimed is:

1. A supercontinuum optical pulse source to provide a combined supercontinuum, comprising:
   one or more seed pulse sources;
   first and second optical amplifiers arranged along first and second respective optical paths, wherein said first and second optical amplifiers are configured to amplify one or more optical signals generated by said one or more seed pulse sources;
   a first microstructured light-guiding member arranged along the first optical path and configured to generate supercontinuum light responsive to an optical signal propagating along the first optical path;
   a second microstructured light-guiding member arranged along the second optical path and configured to generate supercontinuum light responsive to an optical signal propagating along the second optical path;
   a supercontinuum-combining member to combine supercontinuum generated in at least the first and second microstructured light-guiding members to form a combined supercontinuum;
   wherein said supercontinuum-combining member comprises an output fibre, wherein the output fibre comprises a multimode optical fibre supporting a plurality of spatial modes at one or more wavelengths of the combined supercontinuum and
   wherein said optical amplifiers are configured so that in use, the power in a microstructured light-guiding member over the wavelength range 400 nm to 700 nm is greater than 0.5 W.

2. A supercontinuum optical pulse source as claimed in claim 1, wherein said first microstructured light-guiding member comprises a first microstructured optical fibre and said second microstructured light-guiding member comprises a second microstructured optical fibre.

3. A supercontinuum optical pulse source as claimed in claim 1, wherein said output fibre comprises a silica-based optical fibre.

4. A supercontinuum optical pulse source as claimed in claim 1 wherein said first optical amplifier comprises said first microstructured light-guiding member, and said second optical amplifier comprises said second microstructured light-guiding member.

5. A supercontinuum optical pulse source as claimed in claim 1, wherein said supercontinuum-combining member comprises one or more microstructured input fibres.

6. A supercontinuum optical pulse source as claimed in claim 1, wherein said supercontinuum-combining member comprises one or more input fibres having a numerical aperture >0.3 at one or more wavelengths of the combined supercontinuum.

7. A supercontinuum optical pulse source as claimed in claim 1, wherein said first and second optical amplifiers are in optical communication with the same seed pulse source.

8. A supercontinuum optical pulse source as claimed in claim 1, wherein said supercontinuum-combining member comprises one or more input fibres which are single mode at one or more of the wavelengths of the combined supercontinuum.

9. A supercontinuum optical pulse source as claimed in claim 1, wherein said supercontinuum-combining member has one or more multimode input fibres which support a plurality of spatial modes at one or more wavelengths of the combined supercontinuum.

10. A supercontinuum optical pulse source as claimed in claim 1, wherein said supercontinuum-combining member has one or more input fibres which support no more than four spatial modes at any wavelength within the combined supercontinuum.

11. A supercontinuum optical pulse source as claimed in claim 1, wherein the output fibre of said supercontinuum-combining member supports no more than four spatial modes at any wavelength within the combined supercontinuum.

12. A supercontinuum optical pulse source to provide a combined supercontinuum, comprising:
   one or more seed pulse sources;
   first and second optical amplifiers arranged along first and second respective optical paths, wherein said first and second optical amplifiers are configured to amplify one or more optical signals generated by said one or more seed pulse sources;
   a first microstructured light-guiding member arranged along the first optical path and configured to generate supercontinuum light responsive to an optical signal propagating along the first optical path;
   a second microstructured light-guiding member arranged along the second optical path and configured to generate supercontinuum light responsive to an optical signal propagating along the second optical path;
   a supercontinuum-combining member to combine supercontinuum generated in at least the first and second microstructured light-guiding members to form a combined supercontinuum;
   wherein said supercontinuum-combining member comprises an output fibre, wherein the output fibre comprises a multimode optical fibre supporting a plurality of spatial modes at one or more wavelengths of the combined supercontinuum; and
   wherein the output fibre of said supercontinuum-combining member supports a plurality of spatial modes at all wavelengths of the combined supercontinuum.

13. A supercontinuum optical pulse source to provide a combined supercontinuum, comprising:
   one or more seed pulse sources;
   first and second optical amplifiers arranged along first and second respective optical paths, wherein said first and second optical amplifiers are configured to amplify one or more optical signals generated by said one or more seed pulse sources;

a first microstructured light-guiding member arranged along the first optical path and configured to generate supercontinuum light responsive to an optical signal propagating along the first optical path;

a second microstructured light-guiding member arranged along the second optical path and configured to generate supercontinuum light responsive to an optical signal propagating along the second optical path;

a supercontinuum-combining member to combine supercontinuum generated in at least the first and second microstructured light-guiding members to form a combined supercontinuum;

wherein said supercontinuum-combining member comprises an output fibre, wherein the output fibre comprises a multimode optical fibre supporting a plurality of spatial modes at one or more wavelengths of the combined supercontinuum; and a third optical amplifier arranged along a third optical path, and a third microstructured light-guiding member arranged along the third optical path and configured to generate supercontinuum light responsive to an optical signal propagating along the third optical path.

14. A supercontinuum optical pulse source as claimed in claim 12, wherein the output fibre comprises a silica-based optical fibre.

15. A supercontinuum optical pulse source as claimed in claim 12, wherein said first microstructured light-guiding member comprises a first microstructured optical fibre and said second microstructured light-guiding member comprises a second microstructured optical fibre.

16. A supercontinuum optical pulse source as claimed in claim 12 wherein said first optical amplifier comprises said first microstructured light-guiding member, and said second optical amplifier comprises said second microstructured light-guiding member.

17. A supercontinuum optical pulse source as claimed in claim 12, wherein said supercontinuum-combining member comprises one or more microstructured input fibres.

18. A supercontinuum optical pulse source as claimed in claim 12, wherein said supercontinuum-combining member comprises one or more input fibres having a numerical aperture >0.3 at one or more wavelengths of the combined supercontinuum.

19. A supercontinuum optical pulse source as claimed in claim 12, wherein said first and second optical amplifiers are in optical communication with the same seed pulse source.

20. A supercontinuum optical pulse source as claimed in claim 12, wherein said supercontinuum-combining member comprises one or more input fibres which are single mode at one or more of the wavelengths of the combined supercontinuum.

21. A supercontinuum optical pulse source as claimed in claim 12, wherein said supercontinuum-combining member has one or more multimode input fibres which support a plurality of spatial modes at one or more wavelengths of the combined supercontinuum.

22. A supercontinuum optical pulse source as claimed in claim 12, wherein said supercontinuum-combining member has one or more input fibres which support no more than four spatial modes at any wavelength within the combined supercontinuum.

23. A supercontinuum optical pulse source as claimed in claim 12, wherein the output fibre of said supercontinuum-combining member supports no more than four spatial modes at any wavelength within the combined supercontinuum.

24. A supercontinuum optical pulse source as claimed in claim 13, wherein the output fibre comprises a silica-based optical fibre.

25. A supercontinuum optical pulse source as claimed in claim 13, wherein said first microstructured light-guiding member comprises a first microstructured optical fibre and said second microstructured light-guiding member comprises a second microstructured optical fibre.

26. A supercontinuum optical pulse source as claimed in claim 13 wherein said first optical amplifier comprises said first microstructured light-guiding member, and said second amplifier comprises said second microstructured light-guiding member.

27. A supercontinuum optical pulse source as claimed in claim 13, wherein said supercontinuum-combining member comprises one or more microstructured input fibres.

28. A supercontinuum optical pulse source as claimed in claim 13, wherein said supercontinuum-combining member comprises one or more input fibres having a numerical aperture >0.3 at one or more wavelengths of the combined supercontinuum.

29. A supercontinuum optical pulse source as claimed in claim 13, wherein said first and second optical amplifiers are in optical communication with the same seed pulse source.

30. A supercontinuum optical pulse source as claimed in claim 13, wherein said supercontinuum-combining member comprises one or more input fibres which are single mode at one or more of the wavelengths of the combined supercontinuum.

31. A supercontinuum optical pulse source as claimed in claim 13, wherein said supercontinuum-combining member has one or more multimode input fibres which support a plurality of spatial modes at one or more wavelengths of the combined supercontinuum.

32. A supercontinuum optical pulse source as claimed in claim 13, wherein said supercontinuum-combining member has one or more input fibres which support no more than four spatial modes at any wavelength within the combined supercontinuum.

33. A supercontinuum optical pulse source as claimed in claim 13, wherein the output fibre of said supercontinuum-combining member supports no more than four spatial modes at any wavelength within the combined supercontinuum.

* * * * *